United States Patent

Davies et al.

(10) Patent No.: US 7,066,631 B2
(45) Date of Patent: Jun. 27, 2006

(54) VEHICULAR LAMP

(75) Inventors: Steve Davies, Farmington Hills, MI (US); Denis Igoe, Livonia, MI (US); Peter Morton, Royal Oak, MI (US); Helmut Ortinau, Commerce, MI (US)

(73) Assignee: Automotive Lighting Corporation, Wixom, MI (US)

( * ) Notice: Subject to any disclaimer, the term of this patent is extended or adjusted under 35 U.S.C. 154(b) by 162 days.

(21) Appl. No.: 10/692,845

(22) Filed: Oct. 27, 2003

(65) Prior Publication Data

US 2005/0088851 A1 Apr. 28, 2005

(51) Int. Cl.
*F21V 7/00* (2006.01)
*B60Q 1/00* (2006.01)

(52) U.S. Cl. ............ 362/517; 362/510; 362/543; 362/544

(58) Field of Classification Search ........ 362/351, 362/359, 539, 516, 517, 518, 543, 544, 509, 362/510
See application file for complete search history.

(56) References Cited

U.S. PATENT DOCUMENTS

| | | | | | |
|---|---|---|---|---|---|
| 1,977,639 | A | * | 10/1934 | Langdon | 428/630 |
| 4,520,433 | A | * | 5/1985 | Kosmatka | 362/516 |
| 4,555,748 | A | * | 11/1985 | Bradley | 362/547 |
| 4,942,331 | A | * | 7/1990 | Bergman et al. | 313/271 |
| 5,113,321 | A | | 5/1992 | Suzuki | |
| 5,607,219 | A | * | 3/1997 | Brummel et al. | 362/546 |
| 5,977,694 | A | * | 11/1999 | McGuire | 313/110 |

* cited by examiner

*Primary Examiner*—Thomas M. Sember
(74) *Attorney, Agent, or Firm*—Paul Vincent

(57) ABSTRACT

A vehicular lamp has at least one headlamp having a headlamp reflector and a light source provided within a focal area of said headlamp reflector. In order to darken the appearance of the vehicular lamp the inner surface of the headlamp reflector is at least partially darkened.

10 Claims, 1 Drawing Sheet

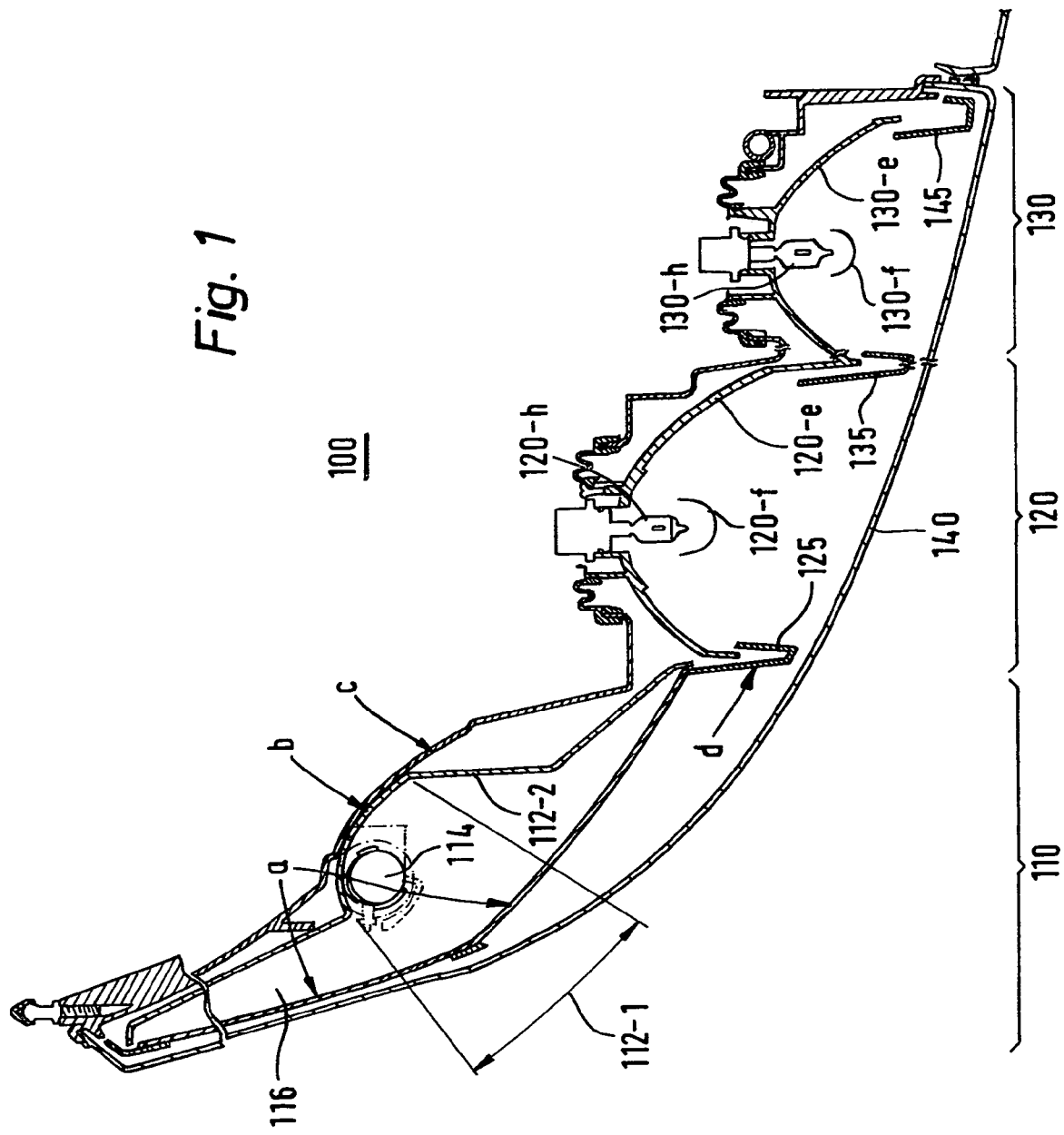

VEHICULAR LAMP

BACKGROUND OF THE INVENTION

The invention relates to a vehicular lamp comprising at least one headlamp and further preferably a turn signal device. The invention further relates to a vehicular headlamp and a turn signal device as separate embodiments.

Vehicular lamps and turn signal devices are basically known in the art. A vehicular lamp is for example known from U.S. Pat. No. 5,113,321. The vehicular lamp disclosed therein comprises a lamp body, an elliptic reflector accommodated in said lamp body wherein said elliptic reflector has at least one focal area. Further said vehicular lamp comprises a light source provided within said first focal area of said elliptic reflector. In order to darken the appearance of said vehicular lamp when the light source is switched off, the cited US-patent teaches to model at least the inner surface of said lamp body in a dark color. Preferably, said dark color is black. Further, the US-patent recommends to embody the light source as a halogen bulb.

Starting from that prior art, it is the object of the present invention to provide alternative embodiments of a vehicular lamp, a vehicular headlamp and a turn signal device to darken the appearance thereof.

SUMMARY OF THE INVENTION

This object is accomplished by a provision of a vehicular lamp comprising at least one headlamp having a headlamp reflector and a first light source provided within a focal area of said headlamp reflector wherein the inner surface of said headlamp reflector is at least partially dark colored.

This embodiment has the advantage, that the appearance of the vehicular lamp is darkened in particular when said light source is switched off.

The dark appearance is further enhanced by the use of a dark finish to the bulb shield mounted in front of the light source.

The object of the present invention is further solved by a vehicular headlamp and by a turn signal device. Said turn signal device comprises a turn signal reflector and a second light source provided within the focal area of said turn signal reflector, wherein the inner surface of said turn signal reflector comprises a first section being located close around the second light source and a second section representing the remaining area of said turn signal reflector wherein said second section is dark, preferably black colored.

The advantages of said solutions to the object of the invention correspond to the advantage mentioned above with respect to the claimed vehicular lamp.

In the following the invention is described in more detail by referring to the accompanying FIGURE which shows a horizontal section through the center of functional areas of the vehicular lamp.

BRIEF DESCRIPTION OF THE DRAWING

FIG. 1 shows a horizontal section through the vehicular lamp in accordance with the invention.

DESCRIPTION OF THE PREFERRED EMBODIMENT

The vehicular lamp comprises a turn signal device 110 as well as a first and a second headlamp 120, 130, representing a first, a second and a third section of said vehicular lamp, respectively.

The turn signal device 110 comprises a turn signal reflector 112 and a second light source 114 provided within the focal area of the said turn signal reflector 112. The inner surface of said reflector 112 is divided up into two sections, a first section 112-1, representing the area close around said second light source 114 and a second section 112-2, representing the remaining area of said turn signal reflector 112, wherein said second section is dark colored. This provides the following functions: the general appearance of the whole of the turn signal device is darkened and the amber appearance of a lens positioned directly in front of the turn signal reflector 112 is reduced. Further, the appearance of the area of the sight reflex 116 immediately adjacent to the outboard sight of the turn signal device is darkened, too.

The vehicular lamp shown in FIG. 1 does not only comprise said turn signal device 110, but also a first and a second headlamp 120, 130. Each of said headlamps comprises a headlamp reflector 120-e and 130-e and a light source 120-h 130-h respectively. The light sources 120-h and 130-h are provided within the focal areas of said reflectors 120-e, 130-e, respectively. In order to darken the appearance of said headlamps the invention proposes to darken at least partially the inner surface of said headlamp reflectors. Preferably this is done by sputter metallization with either of the following materials: chrome, stainless steal or nickel. The light sources 120-h, 130-h can be halogen bulbs with optional infrared reflecting coatings.

There might be provided bulb shields 120-f, 130-f being mounted in front of the light sources 120-h, 130-h, respectively within the focal areas of said headlamp reflectors. Also for darkening the appearance of said headlamps, the inventions proposes to provide a dark finish to the far surface of said bulb shields 120-f, 130-f. The far surface of said bulb shields means that surface, which is not directly opposite said light sources 120-h, 130-h, but which faces the outer cover 140 of said vehicular lamp.

Finally, the dark appearance of the vehicular lamp is further enhanced by the use of a dark or black finish to at least one of the inner trim bezel 125, 135, 145, covering a transition area between said turn signal reflector 112 and the adjacent headlamp reflector 120-e, or between two adjacent headlamp reflectors 120-e, 130-e or between a reflector and the housing of said vehicular lamp.

We claim:

1. A vehicular lamp comprising;
   at least one headlamp having a headlamp reflector and a first light source provided within a first focal area of said headlamp reflector, wherein a reflecting portion of an inner surface of said headlamp reflector comprises a metallic coating having a dark color; and
   a turn signal device having a turn signal reflector and a second light source provided within a second focal area of said turn signal reflector, wherein an inner surface of said turn signal reflector comprises a first section, disposed closely about said second light source and a second section constituting a remaining area of said turn signal reflector, wherein said second section is dark colored.

2. The vehicular lamp of claim 1, wherein said metallic coating comprises at least one of chrome, stainless steel, and nickel.

3. The vehicular lamp of claim 2, wherein said metallic coating is a sputtered coating.

4. The vehicular lamp of claim 1, wherein said headlamp further comprises a bulb shield mounted in front of said first light source within said first focal area of said headlamp reflector, wherein a far surface of said bulb shield has a dark finish.

5. The vehicular lamp of claim 1, wherein said first light source is a halogen bulb.

6. The vehicular lamp of claim 5, wherein said halogen bulb Is a halogen infrared reflected coating HIR bulb.

7. The vehicular lamp of claim 1, wherein an inner trim bezel covering a transition area between said headlamp reflector and said turn signal reflector has a dark color.

8. The vehicular lamp of claim 1, wherein at least two adjacent head lamps are provided having associated adjacent head lamp reflectors, wherein an inner trim bezel covering a transaction area between said adjacent headlamp reflectors has a dark color.

9. The vehicular lamp of claim 1, wherein said dark color is black.

10. The vehicular lamp of claim 1, further comprising a black inner trim bezel in said turn signal device.

* * * * *